(12) United States Patent
Si et al.

(10) Patent No.: US 12,019,174 B2
(45) Date of Patent: Jun. 25, 2024

(54) METHOD FOR CONFIGURING PRS RESOURCE, METHOD FOR CONFIGURING MEASUREMENT GAP, AND RELATED DEVICE

(71) Applicant: VIVO MOBILE COMMUNICATION CO., LTD., Guangdong (CN)

(72) Inventors: Ye Si, Guangdong (CN); Peng Sun, Guangdong (CN); Huaming Wu, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 324 days.

(21) Appl. No.: 17/511,965

(22) Filed: Oct. 27, 2021

(65) Prior Publication Data
US 2022/0050163 A1    Feb. 17, 2022

Related U.S. Application Data

(63) Continuation of application No. PCT/CN2020/085646, filed on Apr. 20, 2020.

(30) Foreign Application Priority Data

Apr. 29, 2019    (CN) .......................... 201910356904.0

(51) Int. Cl.
*G01S 5/02*    (2010.01)
*G01S 5/00*    (2006.01)
(Continued)

(52) U.S. Cl.
CPC .......... *G01S 5/0036* (2013.01); *H04L 5/0051* (2013.01); *H04L 27/26025* (2021.01); *H04W 24/10* (2013.01)

(58) Field of Classification Search
CPC ..... G01S 5/0036; H04L 5/001; H04L 5/0048; H04L 5/0051; H04L 5/0053;
(Continued)

(56) References Cited

U.S. PATENT DOCUMENTS

2012/0252487 A1   10/2012   Siomina et al.
2013/0267246 A1*   10/2013   Wang ................ H04W 24/00
                                                       455/456.1
(Continued)

FOREIGN PATENT DOCUMENTS

CN    101873646 A    10/2010
CN    102595450 A    7/2012
(Continued)

OTHER PUBLICATIONS

WO/2020/069314 A1 (Year: 2020).*
(Continued)

*Primary Examiner* — Siu M Lee
(74) *Attorney, Agent, or Firm* — Price Heneveld LLP

(57) ABSTRACT

A method for configuring a positioning reference signal resource, a method for configuring a measurement gap, and a related device are provided. The method includes: determining a resource position of a PRS within a BWP based on a start PRB position of a PRS resource and the number of PRBs; and performing measurement on the resource position.

18 Claims, 7 Drawing Sheets

(51) Int. Cl.
*H04L 5/00* (2006.01)
*H04L 27/26* (2006.01)
*H04W 24/10* (2009.01)

(58) Field of Classification Search
CPC .......... H04L 5/0094; H04L 27/26025; H04W 24/02; H04W 24/10; H04W 4/02; H04W 64/00; H04W 72/0453
See application file for complete search history.

(56) References Cited

U.S. PATENT DOCUMENTS

| | | | |
|---|---|---|---|
| 2017/0374638 A1 | 12/2017 | Han et al. | |
| 2019/0394666 A1* | 12/2019 | Li | H04L 5/00 |
| 2020/0021409 A1* | 1/2020 | Kumar | H04W 72/0453 |

FOREIGN PATENT DOCUMENTS

| | | |
|---|---|---|
| CN | 104540169 B | 5/2018 |
| EP | 2252109 A1 | 11/2010 |
| WO | 2012044232 A2 | 4/2012 |
| WO | 2012094973 A1 | 7/2012 |
| WO | 2018082032 A1 | 5/2018 |
| WO | 2018200257 A1 | 11/2018 |

OTHER PUBLICATIONS

WO/2018/082032 (Year: 2018).*
LG Electronics, "Discussions on DL and UL Reference Signals for NR Positioning," 3GPP TSG RAN WG1 #96bis R1-1904200, Xi'an, China, Apr. 8-12, 2019 (9 pages).
Samsung, "DL and UL Reference Signals Design for NR Position," 3GPP TSG RAN WG1 #96b R1-1904394, Xi-an, China, Apr. 8-Apr. 12, 2019 (15 pages).
Mediatek, Inc., "Views on NR demodulation and CSI test case setting," 3GPP TSG-RAN WG4 Meeting #90b R4-1903264, Xi-an, China, Apr. 8-12, 2019 (3 pages).
Qualcomm Inc., "Summary#2 of 7.2.10.3: PHY procedures for positioning measurements", 3GPP TSG-RAN WG1 Meeting #96bis, R1-1905811, Xi'an, China, Apr. 8-12, 2019.
Intel Corp., "Remaining details for bandwidth parts", 3GPP TSG RAN WG1 Meeting 91, R1-1720100, Reno, USA, Nov. 27-Dec. 1, 2017.
LG Electronics, "Status Report to TSG", 3GPP TSG RAN meeting #83, RP-190667, Shenzhen, China, Mar. 18-21, 2019.
"3rd Generation Partnership Project; Technical Specification Group Radio Access Network; NR; Radio Resource Control (RRC) protocol specification (Release 15)", 3GPP TS 38.331 V15.5.1 (2019-04), Valbonne, France.

* cited by examiner

METHOD FOR CONFIGURING PRS RESOURCE, METHOD FOR CONFIGURING MEASUREMENT GAP, AND RELATED DEVICE

CROSS-REFERENCE TO RELATED APPLICATIONS

This application is a continuation application of International Application No. PCT/CN2020/085646 filed on Apr. 20, 2020, which claims priority to Chinese Patent Application No. 201910356904.0 in China on Apr. 29, 2019, which are incorporated herein by reference in their entireties.

TECHNICAL FIELD

This disclosure relates to the field of communications technologies, and in particular, to a method for configuring a positioning reference signal (PRS) resource, a method for configuring a measurement gap, and a related device.

BACKGROUND

In positioning technology, a terminal may perform measurement on positioning reference signals (PRS) sent from a plurality of cells or a plurality of transmission points, so as to obtain, through measurement, at least one of a reference signal time difference (RSTD) between the plurality of cells or the plurality of transmission points and reference signal received powers (RSRP) of these cells or transmission points; and then sends a measurement result to a network side for positioning. Because the target positioning technology does not support bandwidth part (bandwidth part, BWP), if the current positioning technology is used, there is a problem of a relatively low probability of detecting a PRS by a terminal.

SUMMARY

According to a first aspect, an embodiment of this disclosure provides a method for configuring a PRS resource, applied to a terminal and including:
determining a resource position of a PRS within a bandwidth part (BWP) based on a start physical resource block (PRB) position and the number of PRBs of a PRS resource; and
performing measurement on the resource position.

According to a second aspect, an embodiment of this disclosure provides a method for configuring a measurement gap, applied to a terminal and including:
sending first signaling, where the first signaling is used to assist a network device in configuring a measurement gap for measuring a PRS.

According to a third aspect, an embodiment of this disclosure provides a method for configuring a measurement gap, applied to a network device and including:
receiving first signaling, where the first signaling is used to assist the network device in configuring a measurement gap for measuring a PRS; and
configuring, according to the first signaling, the measurement gap for measuring the PRS.

According to a fourth aspect, an embodiment of this disclosure provides a terminal, including:
a determining module, configured to determine a resource position of a PRS within a bandwidth part BWP based on a start physical resource block PRB position of a PRS resource and the number of PRBs; and
a measurement module, configured to perform measurement on the resource position.

According to a fifth aspect, an embodiment of this disclosure provides a terminal, including:
a first transmitting module, configured to send first signaling, where the first signaling is used to assist a network device in configuring a measurement gap for measuring a PRS.

According to a sixth aspect, an embodiment of this disclosure provides a network device, including:
a first receiving module, configured to receive first signaling, where the first signaling is used to assist the network device in configuring a measurement gap for measuring a PRS; and
a configuration module, configured to configure, according to the first signaling, the measurement gap for measuring the PRS.

According to a seventh aspect, an embodiment of this disclosure provides a terminal, including a memory, a processor, and a program stored in the memory and capable of running on the processor. When the computer program is executed by the processor, the steps of the method for configuring a PRS resource in the first aspect are implemented, or when the computer program is executed by the processor, the steps of the method for configuring a measurement gap in the second aspect are implemented.

According to an eighth aspect, an embodiment of this disclosure provides a network device, including a memory, a processor, and a program stored in the memory and capable of running on the processor, where when the program is executed by the processor, the steps of the method for configuring a measurement gap in the third aspect are implemented.

According to a ninth aspect, an embodiment of this disclosure provides a computer-readable storage medium, where a computer program is stored in the computer-readable storage medium, and when the computer program is executed by a processor, the steps of the method for configuring a PRS resource in the first aspect are implemented, or when the computer program is executed by the processor, the steps of the method for configuring a measurement gap in the second aspect are implemented, or the steps of the method for configuring a measurement gap in the third aspect are implemented.

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of this disclosure, terms such as "an example" or "for example" are used to represent examples, illustrations, or explanations. Any embodiment or design solution described as "an example" or "for example" in the embodiments of this disclosure shall not be interpreted to be more optional or advantageous than other embodiments or design solutions. To be precise, the words such as "an example" or "for example" are intended to present a related concept in a specific manner.

The following describes the embodiments of this disclosure with reference to the accompanying drawings. A method for configuring a PRS resource, a terminal, and a network device provided in the embodiments of this disclosure may be applied to a wireless communications system. The wireless communications system may be a 5G system, an evolved long term evolution (eLTE) system, an LTE system, or a subsequent evolved communications system.

Figure 1:
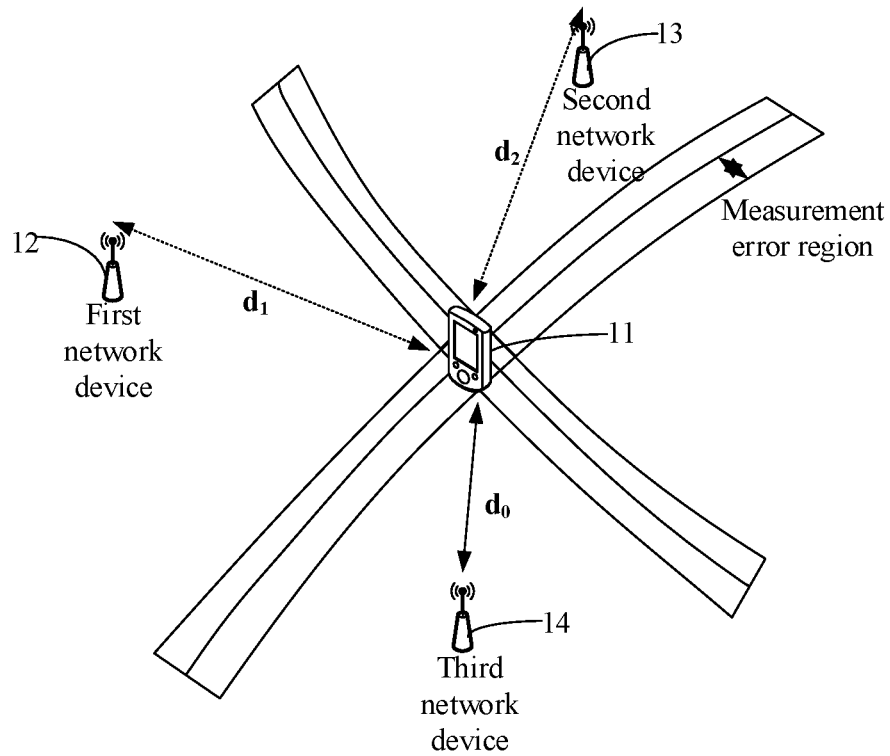
FIG. 1 is a structural diagram of a network system to which embodiments of this disclosure are applicable.

Referring to FIG. 1, FIG. 1 is a structural diagram of a network system to which the embodiments of this disclosure may be applied. As shown in FIG. 1, the network system includes a terminal 11 and a plurality of network devices. Herein, three network devices are used as an example: a first network device 12, a second network device 13, and a third network device 14. The terminal 11 may be a user terminal (UE) or another terminal-side device, for example, a mobile phone, a tablet personal computer (Tablet Personal Computer), a laptop computer (Laptop Computer), a personal digital assistant (personal digital assistant, PDA), a mobile Internet device (MID), or a wearable device (Wearable Device). It should be noted that a specific type of the terminal 11 is not limited in this embodiment of this disclosure. The network device may be a 4G base station, a 5G base station, or a base station of a later release, or a base station in another communications system, or is referred to as a NodeB, or an evolved NodeB, or a transmission and reception point (TRP), or an access point (AP), or other terms in the art. As long as a same technical effect is achieved, the network device is not limited to a specific technical term. In addition, the network device may be a master node (MN) or a secondary node (SN).

It should be noted that a specific type of the network device is not limited herein.

Figure 2:
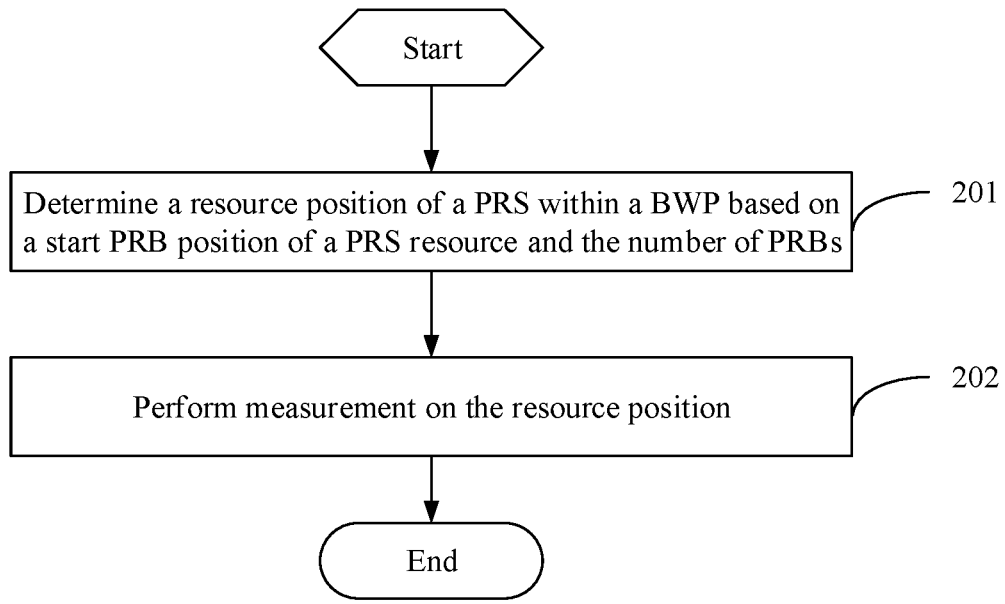
FIG. 2 is a flowchart of a method for configuring a PRS resource according to an embodiment of this disclosure.

Referring to FIG. 2, FIG. 2 is a flowchart of a method for configuring a PRS resource according to an embodiment of this disclosure. The method is applied to a terminal, and as shown in FIG. 2, includes the following steps.

Step 201: Determine a resource position of a PRS within a BWP based on a start PRB position of a PRS resource and the number of PRBs.

The PRS resource may be a PRS resource configured by a serving cell, or the PRS resource may be a PRS resource configured by a neighboring cell. Further, the PRS resource may be a resource position of a PRS in a common resource block grid, and the position of the PRS resource may be determined by the start PRB position (starting RB) of the PRS resource and the number of PRBs (nrofRBs) occupied by the PRS.

The terminal may determine the start PRB position of the PRS resource, the number of PRBs, and a frequency domain granularity in any one of the following manners:

being configured by a network;

being specified by the protocol; and the protocol specifying a plurality of values and the network side indicating one of the values.

Being configured by the network may be that the network device configures at least one of the start PRB position, the number of PRBs, and the frequency domain granularity for the terminal, for example, configuring at least one of the start PRB position, the number of PRBs, and the frequency domain granularity for the terminal by using the LTE positioning protocol (LPP) between the terminal and a positioning server, or configuring at least one of the start PRB position, the number of PRBs, and the frequency domain granularity for the terminal by using other positioning protocols between the terminal and the network device, which is not limited.

In addition, the protocol specifying a plurality of values and the network side indicating one of the values may be indicating one of the values by using LPP signaling. Certainly, this is not limited, for example, indicating may be performed by using RRC signaling or other signaling.

In addition, the process of determining the resource position of the PRS within the BWP can be applied to a case without configuring the measurement gap. In the current positioning technology, in the case without configuring the measurement gap, because a downlink PRS configuration provided to the terminal is independent of a DL BWP configuration in the target positioning technology, it is difficult for the terminal to accurately perform measurement on a PRS if the current positioning technology is used. In this embodiment of this disclosure, in the case that the measurement gap is not configured, the resource position of the PRS in the BWP is determined based on the PRB position and the number of PRBs of the PRS resource, so as to improve a probability of detecting a PRS by the terminal. In this way, the terminal can accurately perform measurement on the PRS based on the resource position of the PRS within the BWP.

In addition, it should be noted that the resource position of the PRS within the BWP can also be understood as the PRS resource in the BWP, or a resource position of a PRS that is measurable by the terminal within the BWP.

In addition, the BWP may be one or more BWPs, and further, may be one or more active BWPs.

Step 202: Perform measurement on the resource position.

In this step, the terminal may perform, on the resource position, measurement of PRSs sent from a plurality of cells or a plurality of transmission points, so as to obtain, through measurement, at least one of RSTD and RSRP between the plurality of cells or the plurality of transmission points, and then send the measurement result to the network device for positioning.

By performing the foregoing steps, the terminal can detect the PRS on the resource position, thereby improving a probability of detecting the PRS by the terminal.

In an optional implementation, the determining the resource position of the PRS within the BWP includes:

determining an index of an initial common resource block (CRB) of the PRS resource within the BWP and a bandwidth of the PRS resource within the BWP.

The start PRB position of the PRS resource may be denoted by an RB offset between a lowest PRB of the PRS resource and a common resource block 0 (CRB #0). The number of PRBs occupied by the PRS resource may be denoted by the number of PRBs across which this PRS resource spans.

Further, in a case that an index of the start PRB position is smaller than an index of a start PRB of the BWP, the index of the initial CRB is the index of the start PRB of the BWP; or in a case that the index of the start PRB position is greater than or equal to the index of the start PRB of the BWP, the index of the initial CRB is the index of the start PRB position.

In this implementation, the resource position of the PRS within the BWP can be accurately determined.

Further, in a case that the index of the start PRB position is greater than or equal to the index of the start PRB of the BWP and the index of the initial CRB is the index of the start PRB position, if nrofRBs>$N_{BWP}^{size}+N_{BWP}^{start}-N_{initial\ RB}$, $N_{PRS}^{BW}=N_{BWP}^{size}+N_{BWP}^{start}-N_{initial\ RB}$, and otherwise $N_{PRS}^{BW}$=nrofRBs; or in a case that the index of the start PRB position is less than the index of the start PRB of the BWP and the index of the initial CRB is the index of the start PRB of the BWP, if startingRB+nrofRBs>$N_{BWP}^{size}+N_{BWP}^{start}$, $N_{PRS}^{BW}=N_{BWP}^{size}+N_{BWP}^{start}-N_{initial\ RB}$, and otherwise, $N_{PRS}^{BW}$ startingRB+nrofRBs−$N_{initial\ RB}$; where startingRB is the index of the start PRB position, $N_{BWP}^{start}$ is the index of the start PRB of the BWP, nrofRBs is the number of PRBs, $N_{BWP}^{size}$ is the bandwidth of the BWP, $N_{initial\ RB}$ is the index of the initial CRB, and $N_{PRS}^{BW}$ is the bandwidth.

In addition, if $N_{PRS}^{BW} \leq 0$, the terminal does not perform measurement on the PRS resource.

In the application process, indication information sent by the network device or protocol preconfiguration may be used to control the terminal to perform the foregoing step of determining the bandwidth of the BWP.

In this implementation, a value of $N_{PRS}^{BW}$ may be determined based on a quantity relationship between startingRB, $N_{BWP}^{start}$, nrofRBs, $N_{BWP}^{size}$ and $N_{initial\ RB}$, so as to accurately determine $N_{PRS}^{BW}$ of the PRS within the BWP.

As an optional implementation, the performing measurement on the resource position includes:

if a numerology of the PRS resource matches a numerology of the BWP, performing measurement on the resource position.

That the numerology of the PRS resource matches the numerology of the BWP may be that the numerology of the PRS resource is the same as or similar to the numerology of the BWP.

In this implementation, measurement is performed only in a case that the numerology of the PRS resource matches the numerology of the BWP, thereby reducing power consumption of the terminal.

Further, measurement may be performed only in a case that the measurement gap is not configured and the numerology of the PRS resource matches the numerology of the BWP. In other words, in the case that the measurement gap is not configured, if the numerology of the PRS resource does not match the numerology of the BWP, the terminal does not perform measurement on the PRS resource. Mismatch herein may be that the numerology of the PRS resource is completely or partially different from the numerology of the BWP.

Certainly, in some embodiments, if a measurement gap is configured and the numerology of the PRS is different from the numerology of the BWP, the terminal may neither perform measurement on the PRS resource.

Figure 3:
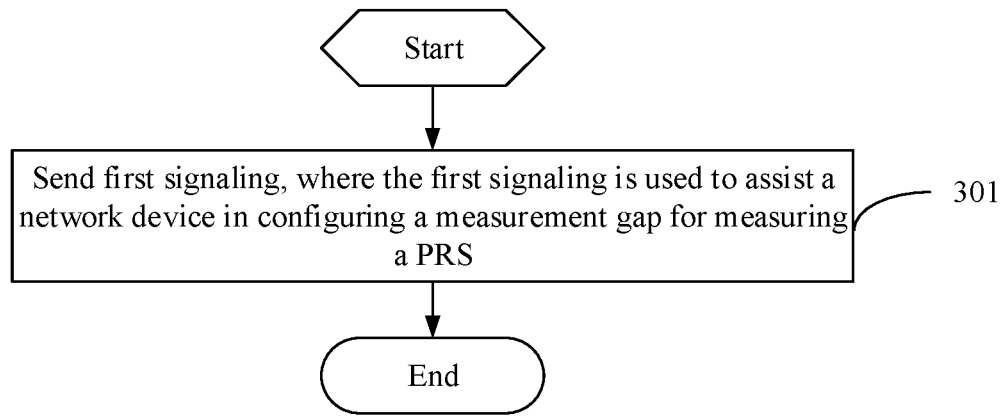
FIG. 3 is a flowchart of a method for configuring a measurement gap according to an embodiment of this disclosure.

It should be noted that, in the case of mismatch, in this embodiment of this disclosure, the first signaling may be sent in the embodiment shown in FIG. 3, so that the network device configures a measurement gap corresponding to the first signaling, so that the terminal performs measurement. For details, refer to the embodiment shown in FIG. 3.

As an optional implementation, a frequency domain granularity of the PRS resource is 1 RB, 2 RBs, 4 RBs, or 8 RBs.

In a case that the frequency domain granularity is 1 RB, an index of the start PRB position is one value in (0, 1, 2, 3, . . . , 275*8−1), and the number of PRBs is one value in (Xmin, Xmin+1, Xmin+2, . . . , Xmax), where Xmin is 1, 11, 12, 24, or 25, and Xmax is 264, 272, 273, 275, or 2200; or in a case that the frequency domain granularity is 2 RBs, an index of the start PRB position is one value in (0, 2, 4, 8, . . . , 2198), and the number of PRBs is one value in (Xmin, Xmin+2, Xmin+4, . . . Xmax), where Xmin is 2, 12, or 24, and Xmax is 264, 272, 274, 276, or 2200; or in a case that the frequency domain granularity is 4 RBs, an index of the start PRB position is one value in (0, 4, 8, . . . , 2196), and the number of PRBs is one value in (Xmin, Xmin+4, Xmin+8, . . . Xmax), where Xmin is 4, 12, or 24, and Xmax is 264, 272, 276, or 2200; or in a case that the frequency domain granularity is 8 RBs, an index of the start PRB position is one value in (0, 8, 16, 24, . . . , 2192), and the number of PRBs is one value in (Xmin, Xmin+8, Xmin+16, . . . Xmax), where Xmin is 8, 16, or 24, and Xmax is 264, 272, 280, or 2200.

In this implementation, the index of the start PRB position and a value range of the number of PRBs may be determined based on the value of the frequency domain granularity of the PRS resource, thereby simplifying the process of determining the index of the start PRB position and the number of PRBs.

As an optional implementation, if the PRS resource spans a plurality of BWPs in a plurality of component carriers (CC), the determining the resource position of the PRS within the BWP includes:

determining the resource position of the PRS in the plurality of BWPs; and the performing measurement on the resource position includes:

performing measurement on the resource position of the PRS in all or part of the plurality of BWPs.

It should be noted that the terminal can work only in one active BWP in one carrier at one time point. For example, if the PRS resource spans N CCs, the PRS may span M BWPs, where M<=N. That is, the PRS resource spanning the plurality of BWPs in the plurality of CCs can be denoted as: the PRS resource spanning M BWPs in N CCs. in this implementation, the terminal performs measurement on the PRS of the M BWPs.

In this implementation, in a case that the PRS resource spans the plurality of BWPs in the plurality of CCs, measurement may be performed on the resource position of the PRS in all or part of the plurality of BWPs, to implement measurement on the plurality of BWPs in the plurality of CCs, thereby improving applicability of the measurement process.

In an implementation, the part of the BWPs may include:
top N BWPs in descending order of the bandwidths, where N is an integer greater than or equal to 1; or
BWPs whose bandwidths exceed a bandwidth threshold; or
BWPs in at least one CC.

It should be noted that, in actual application, the part of the BWPs may alternatively be part of the BWPs that is selected in other manners, which are not provided one by one herein. The BWPs of the at least one CC may be indicated by the network, or selected by the terminal, or specified by the protocol.

In the foregoing implementation, the reporting the measurement result may be performing combination processing on resources or measurement results of the plurality of BWPs, or may be skipping performing combination processing. For example, the method further includes:
reporting a measurement result, where the measurement result includes measurement results obtained through measurement in the all or part of the BWPs, or the measurement result is a measurement result obtained by combining PRS resources in the all or part of the BWPs and performing measurement on a combined resource, or a measurement result obtained by averaging or weighting measurement results obtained through measurement in the all or part of the BWPs.

The measurement result obtained by combining PRS resources in the all or part of the BWPs and performing measurement on a combined resource may be combining PRS resources in the all or part of the BWPs to obtain one combined PRS resource, and then performing measurement on the basis of the PRS resource, so as to obtain the measurement result. For example, to calculate an RSTD, the terminal may perform time-domain related processing on a long sequence corresponding to the combined PRS resource.

The terminal needs to report the measurement result to the network device. In an implementation, the terminal does not combine the measurement results obtained through measurement in all or part of the BWPs, but separately reports the measurement results obtained through measurement in all or part of the BWPs. In another implementation, the terminal reports a measurement result that is obtained through measurement on a resource obtained by combining PRS resources in all or part of the BWPs, or reports a measurement result that is obtained by averaging or weighting the measurement results obtained through measurement in all or part of the BWP, so as to combine the measurement results obtained through measurement in the plurality of BWPs into one measurement result.

In actual applications, a specific manner used by the terminal for reporting the measurement result may be determined in a manner of being indicated by the network, being specified by a preset protocol, or being autonomously selected by the terminal.

In this implementation, the measurement result may be reported in the case that the PRS resource spans a plurality of BWPs in a plurality of CCs.

As an optional implementation, the reporting the measurement result includes:
reporting a first message, where the first message includes the measurement result, and further includes at least one of the following:
a BWP identifier, a PRS resource identifier, a PRS resource set identifier, a transmission and reception point (TRP) identifier, a cell identity, and a CC identifier.

In specific implementation, the cell identity may be a primary cell (Pcell) identity, a secondary cell (Scell) identity, or a primary secondary cell PScell) identity.

As an optional implementation, at least one of the behavior of determining the resource position by the terminal and the behavior of performing measurement by the terminal is configured by the network, indicated by the network, specified by the protocol, or selected by the terminal.

In this embodiment of this disclosure, the terminal can detect the PRS on the resource position, thereby improving a probability of detecting the PRS by the terminal.

Referring to FIG. 3, FIG. 3 is a flowchart of a method for configuring a measurement gap according to an embodiment of this disclosure. The method is applied to a terminal, and as shown in FIG. 3, the method includes the following steps:

Step 301: Send first signaling, where the first signaling is used to assist a network device in configuring a measurement gap for measuring a PRS.

In specific implementation, the measurement gap may also be referred to as a measurement gap. In a case that the measurement gap is configured, the terminal may perform measurement on a PRS outside an active BWP (for example, active DL BWP) by using the configured measurement gap. Alternatively, in the case that the measurement gap is configured, the terminal may perform, by using the configured measurement gap, measurement on a PRS whose numerology is different from that of the active BWP.

In addition, in a case of receiving the first signaling, the network device configures, according to the first signaling, a measurement gap for measuring the PRS. For example, the network device configures a corresponding measurement through RRC signaling or LPP signaling. Alternatively, in a case of receiving the first signaling, the network device may not configure a measurement gap. Configuring or not configuring the measurement gap is determined by the network side.

In this implementation, in a case that the terminal requires the measurement gap for measurement, the terminal sends the first signaling, so that the network device configures the measurement gap according to the first signaling, thereby improving a probability of detecting the PRS by the terminal.

In the current positioning technology, because the measurement gap is independent of the configuration of the PRS, it is difficult for the terminal to accurately perform measurement on the PRS. In this embodiment of this disclosure, in a case that the measurement gap needs to be configured, the terminal sends the first signaling, so that the network device configures, according to the first signaling, the measurement gap for measuring the PRS, thereby improving a probability of detecting the PRS by the terminal. In this way, the terminal can accurately perform measurement on the PRS.

As an optional implementation, the first signaling is signaling sent to the network device, and the first signaling is used to indicate a measurement gap configuration expected by the terminal; or the first signaling is signaling sent to the network device and including positioning assistance information, and the first signaling is used to indicate configuring a measurement gap configuration associated with the positioning assistance information.

In this implementation, in a case that the first signaling is used to indicate the measurement gap configuration expected by the terminal, the measurement gap may be configured according to expectation of the terminal, thereby improving a degree of matching between the configured measurement gap and that expected by the terminal. In addition, in a case that the first signaling is used to indicate configuring the measurement gap configuration associated with the positioning assistance information, the measurement gap may be configured according to a requirement of the positioning assistance information, thereby improving a degree of matching between the configured measurement gap and the positioning assistance information.

In specific implementation, the network device is a serving base station, that is, the terminal sends the signaling to a serving cell.

It should be noted that in actual application, the network device may alternatively be other network devices than the base station, such as a transmission node or a location server.

As an optional implementation, the first signaling is further used to indicate to the network device that the terminal performs measurement by using a measurement gap, or the first signaling is further used to indicate to the network device that the terminal requests to perform measurement by using a measurement gap.

The indicating that the terminal performs measurement by using the measurement gap may be that the terminal is to start performing measurement by using the measurement gap, or the terminal immediately performs measurement by using the measurement gap, or the terminal has accurately performed measurement by using the measurement gap.

In this implementation, the terminal informs the network device through the first signaling that the terminal is to start performing measurement by using the measurement gap or requests to perform measurement by using the measurement gap, so that the network device makes a corresponding response in a case of receiving the first signaling, for example, agreeing to the terminal to use the measurement gap for performing measurement and configuring the corresponding measurement gap for the terminal.

Further, in a case that the first signaling is used to indicate the measurement gap configuration expected by the terminal, the first signaling may include at least one of the following:

frequency information of a PRS resource, PRS measurement offset information, measurement gap pattern identification information (measurement gap pattern ID), measurement gap timing advance, and the number of measurement gaps.

The PRS measurement offset information may be PRS measurement offset information (measurement NR PRS offset) in an NR system, used to indicate to the network side a gap offset required by the terminal for measuring the PRS. The PRS may be a PRS sent by a serving cell, or a PRS sent by a neighboring cell. The gap offset may be an offset obtained through calculation by the terminal based on time domain information of a PRS of the serving cell and/or the neighboring cell. The gap offset may be a subframe offset from a start subframe 0 in a system frame number (SFN) 0 of the serving cell.

Similarly, both the measurement gap pattern identification information and the measurement gap timing advance information may be obtained by the terminal based on the time domain information of the PRS.

The number of measurement gaps may also be obtained based on a requirement of the terminal. There may be one or more measurement gaps. If one measurement gap cannot satisfy measurement on the PRS of the serving cell or neighboring cell by the UE, the UE may request for configuring a plurality of measurement gaps.

The measurement gap pattern identification information may indicate a measurement gap expected by the user, or may indicate a measurement gap not expected by the terminal.

In specific implementation, the measurement gap configured by the network device for measuring the PRS matches the frequency information of the PRS resource, the PRS measurement offset information, the measurement gap pattern identification information, the measurement gap timing advance, and the like on the terminal, thereby improving accuracy of PRS resource configuration.

In specific implementation, the positioning assistance information may include at least one of the following:

search window information of a PRS resource, PRS time domain configuration information, PRS muting pattern information, and cell timing information.

The PRS time domain configuration information may include: a PRS period, a time domain offset, and PRS measurement occasion information.

As an optional implementation, the method further includes:

sending second signaling, where the second signaling is used to indicate to the network device that the terminal is to stop performing measurement by using the measurement gap.

In this implementation, the terminal may send the second signaling to inform the network device that the terminal is to stop performing measurement using the measurement gap. In this way, the network device can stop related processing on the measurement gap after the terminal stops performing measurement using the measurement gap. For example, the network device configures stopping of the measurement gap by using RRC signaling, thereby reducing resource occupation on the network device.

As an optional implementation, the sending the first signaling includes:

if the PRS resource is not in an active BWP of the terminal, sending the first signaling; or if part of the PRS resource is in an active BWP of the terminal, send the first signaling; or if part of the PRS resource is in an active BWP of the terminal and a first condition is satisfied, send the first signaling; or if a numerology of the PRS resource does not match a numerology of an active BWP of the terminal, send the first signaling.

The mismatch between the numerology of the PRS resource and the numerology of the active BWP of the terminal may be that the numerology of the PRS resource is completely or partially different from the numerology of the active BWP of the terminal.

It should be noted that for the PRS resource in this implementation, reference may be made to the related description in the embodiment shown in FIG. 2, for example, being configured by the serving cell or neighboring cell. Details are not described herein again.

It should be noted that, in actual application, the terminal may alternatively not send the first signaling in a case that the PRS is completely included in the active BWP of the terminal. In this implementation, in a case that the terminal needs to send the first signaling to assist the network device in configuring the measurement gap for measuring the PRS, the terminal may be controlled to send the first signaling; in other cases, the first signaling may not be sent, thereby reducing occupation of terminal resources by the first signaling.

Further, that the first condition is satisfied may indicate at least one of the following:
- a bandwidth of the part of PRS resource in the active BWP of the terminal is less than a bandwidth threshold;
- a bandwidth of the part of PRS resource in the active BWP of the terminal fails to meet a measurement accuracy requirement; and
- a numerology of the part of PRS resource in the active BWP of the terminal does not match a numerology of the active BWP of the terminal.

It should be noted that, in actual application, the first condition may be selected and determined in a manner of being preconfigured by the network device, being specified by a preset protocol, or being autonomously selected by the terminal.

In this implementation, in a case that the bandwidth of the part, of the PRS resource, in the active BWP of the terminal is less than the bandwidth threshold or the bandwidth of the part, of the PRS resource, in the active BWP of the terminal fails to meet the measurement accuracy requirement, and that part of the PRS resource is in an active BWP of the terminal, it is determined that the terminal needs to send the first signaling to assist the network device in configuring the measurement gap for measuring the PRS. Based on this, the terminal is controlled to send the first signaling, thereby providing a basis for determining whether to send the first signaling.

As an optional implementation, the first signaling is positioning capability reporting signaling, and the positioning capability reporting signaling includes BWP bandwidth information.

The positioning capability reporting signaling may be a report message used for reporting LPP capability information of the terminal, for example, reporting information such as a BWP bandwidth in a field of LPP capability information report.

In this implementation, the network device may be a location server, for example, a location management function (LMF). The location server may configure a corresponding measurement gap for the terminal, and notify a corresponding serving cell and/or neighboring cell, so that the serving cell configures the measurement gap for the terminal.

It should be noted that for the PRS resource in this embodiment, reference may be made to the related description of the PRS resource in the embodiment shown in FIG. 2. Details are not described herein again.

In this embodiment of this disclosure, through the foregoing steps, the terminal can assist the network device in configuring the measurement gap for measuring the PRS, so that the terminal can detect the PRS on the resource position, thereby improving a probability of detecting the PRS by the terminal.

Figure 4:
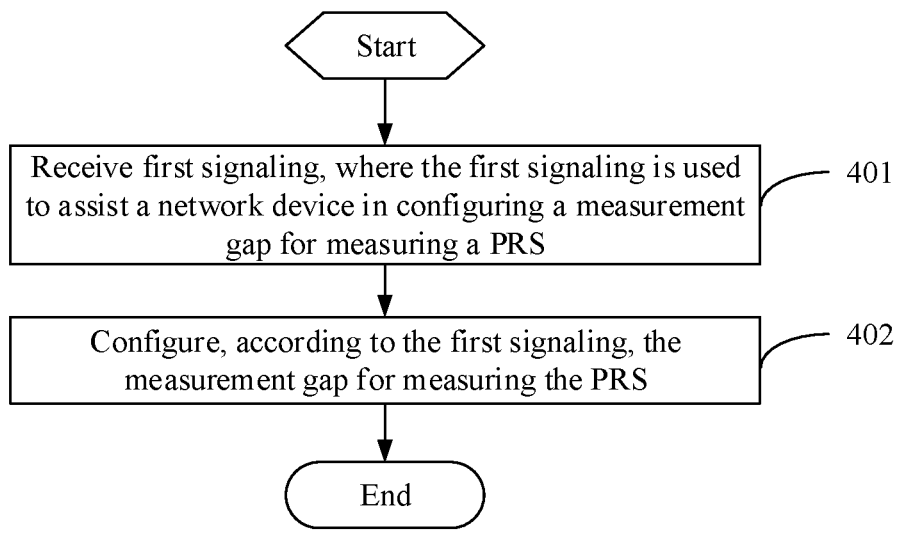
FIG. 4 is a flowchart of another method for configuring a measurement gap according to an embodiment of this disclosure.

Referring to FIG. 4, FIG. 4 is a flowchart of a method for configuring a measurement gap according to an embodiment of this disclosure. The method is applied to a network device, and as shown in FIG. 4, the method includes the following steps.

Step 401: Receive first signaling, where the first signaling is used to assist the network device in configuring a measurement gap for measuring a PRS.

Step 402: Configure, according to the first signaling, the measurement gap for measuring the PRS.

In specific implementation, the first signaling is the first signaling sent by the terminal in the previous embodiment, and details are not repeated herein.

Optionally, the first signaling is used to indicate a measurement gap configuration expected by a terminal; or
the first signaling includes positioning assistance information, and the first signaling is used to indicate configuring a measurement gap configuration associated with the positioning assistance information.

Optionally, the network device is a serving base station.

Optionally, the first signaling is further used to indicate to the network device that the terminal is to start performing measurement by using the measurement gap.

Optionally, in a case that the first signaling is used to indicate the measurement gap configuration expected by the terminal, the first signaling includes at least one of the following:
frequency information of a PRS resource, PRS measurement offset information, measurement gap pattern identification information, measurement gap timing advance, and the number of measurement gaps.

Optionally, the positioning assistance information includes at least one of the following:
search window information of a PRS resource, PRS time domain configuration information, PRS muting pattern information, and cell timing information.

Optionally, the method further includes:
receiving second signaling, where the second signaling is used to indicate to the network device that the terminal is to stop performing measurement by using the measurement gap; and
stopping, according to the second signaling, configuring the measurement gap.

In specific implementation, the second signaling is the second signaling sent by the terminal in the previous embodiment, and details are not repeated herein.

Optionally, the first signaling is positioning capability reporting signaling, and the positioning capability reporting signaling includes BWP bandwidth information.

Optionally, the network device is a location server.

Optionally, the network device directly configures the measurement gap for a terminal; or
the network device configures the measurement gap for at least one of a serving cell and a neighboring cell, so that the serving cell configures the measurement gap for a terminal.

It should be noted that this embodiment serves as an implementation of the network device corresponding to the embodiment shown in FIG. 3; for specific implementations of this embodiment, reference may be made to related descriptions of the embodiment shown in FIG. 3, and details are not described in this embodiment to avoid repetition; and the same beneficial effects can be achieved.

It should be noted that the plurality of PRS resource configuration methods provided in this embodiment of this disclosure may be combined with each other for implementation. For example, in the embodiment shown in FIG. 3, in a case of indicating stopping performing measurement by using the measurement gap, the resource position of the PRS within the BWP may be determined and measurement may be performed based on the PRS resource configuration shown in FIG. 2. Certainly, the plurality of implementations of the PRS resource configuration method in this embodiment of this disclosure may be performed separately, for example, being illustrated by using the following four solutions.

Embodiment 1

The position of the PRS resource in the common resource block grid may be determined by the start PRB position (startingRB) of the PRS resource and the number of PRBs (nrofRBs) occupied by the PRS. The start PRB position of the PRS resource is an RB offset between a lowest PRB of the PRS resource and (CRB #0). The number of PRBs occupied by the PRS resource is the number of PRBs across which this PRS resource spans.

Specifically, the frequency domain granularity of the PRS resource may be 1 RB, 2 RBs, 4 RBs, or 8 RBs.

If the frequency domain granularity of the PRS resource is 1 RB, the start PRB position of the PRS resource may be (0, 1, 2, 3, . . . , 275*8−1) in RBs, and the number of PRBs occupied by the PRS may be (Xmin, Xmin+1, Xmin+2, . . . Xmax). A value of Xmin may be one of 1, 11, 12, 24, or 25, and a value of Xmax may be one of 264, 272, 273, 275, or 2200.

If the frequency domain granularity of the PRS resource is 2 RBs, the start PRB position of the PRS resource may be (0, 2, 4, 8, . . . , 2198) in RBs and is an integer multiple of 2; and the number of PRBs occupied by the PRS may be is an integer multiple of 2, and may be (Xmin, Xmin+2, Xmin+4, . . . Xmax). A value of Xmin may be one of 2, 12, or 24, and a value of Xmax may be one of 264, 272, 274, 276, or 2200.

If the frequency domain granularity of the PRS resource is 4 RBs, the start PRB position of the PRS resource may be (0, 4, 8, . . . , 2196) in RBs and is an integer multiple of 4; and the number of PRBs occupied by the PRS may be is an integer multiple of 4, and may be (Xmin, Xmin+4, Xmin+8, . . . Xmax). A value of Xmin may be one of 4, 12, or 24, and a value of Xmax may be one of 264, 272, 276, or 2200.

If the frequency domain granularity of the PRS resource is 8 RBs, the start PRB position of the PRS resource may be (0, 8, 16, 24, . . . , 2192) in RBs and is an integer multiple of 8; and the number of PRBs occupied by the PRS may be is an integer multiple of 8, and may be (Xmin, Xmin+8, Xmin+16, . . . Xmax). A value of Xmin may be one of 8, 16, or 24, and a value of Xmax may be one of 264, 272, 280, or 2200.

On the terminal side, the start PRB position of the PRS resource, the number of PRBs, and the frequency domain granularity may be obtained in one of the following manners:

being configured (for example, using LPP signaling) by the network;
being specified by the protocol; and
the protocol specifying a plurality of values and the network side indicating (for example, using LPP signaling) one of the values.

Embodiment 2

This embodiment describes the behavior of determining the bandwidth for receiving the PRS in frequency domain within the BWP in a case that the measurement gap is not configured.

When the start PRB position of the PRS resource startingRB<$N_{BWP}^{start}$, the lowest CRB index of the PRS resource measurable by the terminal is $N_{initial\ RB}=N_{BWP}^{start}$; and otherwise, the terminal assumes $N_{initial\ RB}$=startingRB.

If startingRB≥$N_{BWP}^{start}$, if the number of PRBs occupied by the PRS resource is nrofRBs>$N_{BWP}^{size}+N_{BWP}^{start}-N_{initial\ RB}$, the bandwidth of the PRS resource measurable by the UE is $N_{PRS}^{BW}=N_{BWP}^{size}+N_{BWP}^{start}-N_{initial\ RB}$; and otherwise, $N_{PRS}^{BW}$=nrofRBs. If startingRB<$N_{BWP}^{start}$, and if the number of PRBs occupied by the PRS resource startingRB+nrofRBs>$N_{BWP}^{size}+N_{BWP}^{start}$, the bandwidth of the PRS resource measurable by the UE is $N_{PRS}^{BW}=N_{BWP}^{size}+N_{BWP}^{start}-N_{initial\ RB}$); and otherwise, $N_{PRS}^{BW}$=startingRB+nrofRBs−$N_{initial\ RB}$.

If $N_{PRS}^{BW}$≤0, the terminal does not perform measurement on the PRS resource.

The behavior of the terminal may be indicated by the network side or specified by the protocol.

Embodiment 3

This embodiment provides a solution to a case that the measurement gap needs to be configured. The method for configuring the measurement gap may be at least one of the following methods:

Method (1)

Based on the positioning assistance information (for example, a PRS bandwidth or time), the terminal sends request signaling to the network side. The signaling is used to indicate to the network side that the terminal is to start/stop performing DL RSTD and/or DL RSRP measurement by using the measurement gap, and indicate, to the network side, a measurement gap configuration expected by the terminal for performing measurement; or the signaling is used by the terminal to indicate to the network side that the terminal is to start/stop performing DL RSTD and/or DL RSRP measurement by using the measurement gap, and carries part of the positioning assistance information, so as to indicate the network side to configure the measurement gap associated with the part of the positioning assistance information. According to the signaling of the terminal, the network side configures the corresponding measurement gap or stops the measurement gap through RRC signaling. The terminal behavior may be indicated by the network (not limited to the serving cell, which may be a location server, a serving cell, or other devices), may be specified by the protocol or selected by the terminal.

Signaling 1 sent by the terminal may include at least one of the following information: frequency related information of an NR PRS resource, NR PRS measurement offset information (measurement NR PRS offset) or gap offset information, measurement gap pattern ID information, and whether the terminal starts or stops performing measurement using the measurement gap.

Signaling 2 sent by the terminal may include part of the positioning assistance information (at least one of information related to a search window of the PRS resource, PRS time domain configuration information (a PRS period, a time domain offset, occasion information, or the like), PRS muting pattern information, and cell timing information) and whether the terminal starts or stops performing measurement by using measurement gap.

Further, the terminal may choose to send or not to send the request signaling. The terminal behavior may be indicated by the network (which is not limited to the serving cell), specified by the protocol, or selected by the terminal. Specifically, if the PRS is completely included in the active DL BWP of the terminal, the terminal does not send the request signaling. If the PRS is not completely included in the active DL BWP of the terminal, the terminal sends the request signaling. If the PRS is partially included in the active DL BWP of the terminal, the terminal sends the request signaling. Alternatively, if the PRS is partially included in the active DL BWP of the terminal, the UE sends the request signaling based on a condition; and otherwise, the UE does not send the request signaling. The condition may be indicated by the network, specified by the protocol, or selected by the UE, and the condition is not limited to one or more of the following:

- a bandwidth of the part of PRS resource included in the active DL BWP of the terminal is not greater than X, where X is measured in Hz or RB; or
- a bandwidth of the part of PRS resource included in the active DL BWP of the terminal does not meet the accuracy requirement.

Method (2)

The terminal reports information such as a BWP bandwidth in the field of LPP capability information report, and the LMF configures the corresponding measurement gap for the UE and notifies the corresponding serving cell and/or neighboring cell. The serving cell then informs the UE of the corresponding measurement gap.

Embodiment 4

When the PRS resource configured by the network side spans a plurality of CCs, the PRS resource may span M BWPs. The terminal may perform measurement on the PRS resource on the M DL active BWPs (belonging to M CCs respectively) simultaneously. The measurement method for the terminal may be one of the following:

- the terminal measures the PRS resource on all the M BWPs;
- the terminal performs measurement on the PRS resource only on N BWPs with the largest bandwidth, and N may be 1;
- the terminal performs measurement on the PRS resource only on N BWPs whose bandwidths exceed a threshold;

The terminal performs measurement on the PRS resource only on BWPs of one or more specific CCs. The one or more CCs may be Pcells or Scells. The one or more CCs may be indicated by the network, specified by the protocol, or selected by the UE. If there is no measurable PRS resource on the BWPs corresponding to the one or more CCs, no measurement is performed.

All the foregoing measurement manners may be indicated by the network, specified by the protocol, or selected by the terminal. For measurement of the PRS resource within the BWP, refer to Solution 2.

After PRS measurement is completed, the terminal needs to report the measurement result. The reporting manner for the terminal may be one of the following:

- the terminal UE does not perform combination processing on the PRS resources in the plurality of CCs or BWPs. The reporting manner is one of the following:
  - the terminal reports a measurement result obtained on each of M BWPs;
  - the terminal reports a measurement result of the PRS resource on N BWPs with the largest bandwidth, and N may be 1;
  - the terminal reports a measurement result of the PRS resource on N BWPs whose bandwidths exceed a threshold; and
  - the terminal reports measurement results of BWPs in one or more CCs.

(2) The terminal performs combination processing on PRS resources measured on a plurality of CCs or BWPs, and reports a measurement result obtained after integrating those of the plurality of CCs or BWPs. The combination processing method may be one of the following methods:

- the terminal averages or weights the measurement results of the plurality of CCs or BWPs, and then reports the measurement result;
- the terminal combines the measurable PRS resources on the plurality of CCs or BWPs, equivalent to one PRS resource with a large bandwidth, processes the PRS resource with the large bandwidth, and then reports the measurement result.

The reporting manner for the terminal may be indicated by the network, specified by the protocol, or selected by the terminal.

The reported content may include at least one of Pcell identity/Scell identity, BWP ID, PRS resource ID, PRS resource set ID, TRP/cell ID, and so on.

At least one of the following can be implemented in this embodiment of this disclosure:

- a value of the start PRB position of the PRS resource; and
- a value of the number of PRBs occupied by the PRS.

When the measurement gap is not configured, the PRS bandwidth that can be measured by the UE is $$N_{PRS}^{BW}=N_{BWP}^{size}+N_{BWP}^{start}-N_{initial\ RB}; \text{ or}$$
$$N_{PRS}^{BW}=\text{starting}RB+\textit{nrofRBs}-N_{initial\ RB}.$$

When the measurement gap can be configured, the terminal may send request signaling to the serving cell to request for a measurement gap configuration. Alternatively, the terminal reports BWP related information in the LPP capability information, and the LMF directly configures the measurement gap.

When the bandwidth of the PRS resource spans CCs for transmission, the UE may measure the PRS resource on a plurality of DL active BWPs simultaneously. The terminal may perform measurement on all or part of the BWPs, and the terminal may report a measurement result per BWP or CC or report an integrated measurement result after combination processing.

Figure 5:
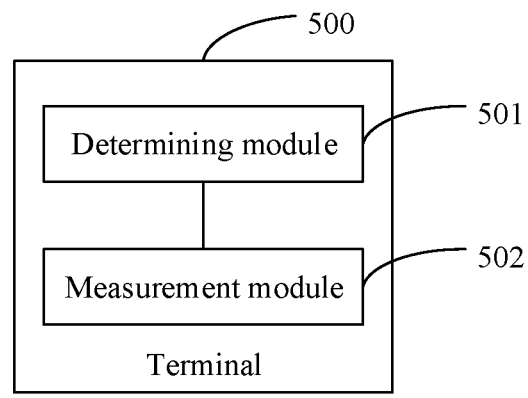
FIG. 5 is a structural diagram of a terminal according to an embodiment of this disclosure.

FIG. 5 is a structural diagram of a terminal according to an embodiment of this disclosure. As shown in FIG. 5, the terminal 500 includes:

- a determining module 501, configured to determine a resource position of a PRS within a bandwidth part BWP based on a start physical resource block PRB position of a PRS resource and the number of PRBs; and
- a measurement module 502, configured to perform measurement on the resource position.

Optionally, the determining module 501 is specifically configured to:

based on the start physical resource block PRB position and the number of PRBs of the PRS resource, determine an index of an initial common resource block CRB of the PRS resource within the BWP and a bandwidth of the PRS resource within the BWP.

Optionally, in a case that an index of the start PRB position is smaller than an index of a start PRB of the BWP, the index of the initial CRB is the index of the start PRB of the BWP; or in a case that the index of the start PRB position is greater than or equal to the index of the start PRB of the BWP, the index of the initial CRB is the index of the start PRB position.

Optionally, in a case that the index of the start PRB position is greater than or equal to the index of the start PRB of the BWP and the index of the initial CRB is the index of the start PRB position, if nrofRBs>$N_{BWP}^{size}+N_{BWP}^{start}-N_{initial\ RB}$, $N_{PRS}^{BW}=N_{BWP}^{size}+N_{BWP}^{start}-N_{initial\ RB}$, and otherwise $N_{PRS}^{BW}$=nrofRBs; or in a case that the index of the start PRB position is less than the index of the start PRB of the BWP and the index of the initial CRB is the index of the start PRB of the BWP, if startingRB+nrofRBs>$N_{BWP}^{size}+N_{BWP}^{start}$, $N_{PRS}^{BW}=N_{BWP}^{size}+N_{BWP}^{start}-N_{initial\ RB}$, and otherwise, $N_{PRS}^{BW}$=startingRB+nrofRBs-$N_{initial\ RB}$;
where
startingRB is the index of the start PRB position, $N_{BWP}^{start}$ is the index of the start PRB of the BWP, nrofRBs is the number of PRBs, $N_{BWP}^{size}$ is the bandwidth of the BWP, $N_{initial\ RB}$ is the index of the initial CRB, and $N_{PRS}^{BW}$ is the bandwidth.

Optionally, a frequency domain granularity of the PRS resource is 1 RB, 2 RBs, 4 RBs, or 8 RBs.

In a case that the frequency domain granularity is 1 RB, an index of the start PRB position is one value in (0, 1, 2, 3, . . . , 275*8−1), and the number of PRBs is one value in (Xmin, Xmin+1, Xmin+2, . . . Xmax), where Xmin is 1, 11, 12, 24, or 25, and Xmax is 264, 272, 273, 275, or 2200; or in a case that the frequency domain granularity is 2 RBs, an index of the start PRB position is one value in (0, 2, 4, 8, . . . , 2198), and the number of PRBs is one value in (Xmin, Xmin+2, Xmin+4, . . . Xmax), where Xmin is 2, 12, or 24, and Xmax is 264, 272, 274, 276, or 2200; or in a case that the frequency domain granularity is 4 RBs, an index of the start PRB position is one value in (0, 4, 8, . . . , 2196), and the number of PRBs is one value in (Xmin, Xmin+4, Xmin+8, . . . Xmax), where Xmin is 4, 12, or 24, and Xmax is 264, 272, 276, or 2200; or in a case that the frequency domain granularity is 8 RBs, an index of the start PRB position is one value in (0, 8, 16, 24, . . . , 2192), and the number of PRBs is one value in (Xmin, Xmin+8, Xmin+16, . . . Xmax), where Xmin is 8, 16, or 24, and Xmax is 264, 272, 280, or 2200.

Optionally, if the PRS resource spans a plurality of BWPs in a plurality of CCs, the determining module 501 is specifically configured to:

determine the resource position of the PRS in the plurality of BWPs based on the start physical resource block PRB position and the number of PRBs of the PRS resource.

The measurement module 502 is configured to perform measurement on the resource position of the PRS in all or part of the plurality of BWPs.

Optionally, the part of BWPs includes:
top N BWPs in descending order of the bandwidths, where N is an integer greater than or equal to 1; or
BWPs whose bandwidths exceed a bandwidth threshold; or
BWPs in at least one component carrier CC.

Figure 6:
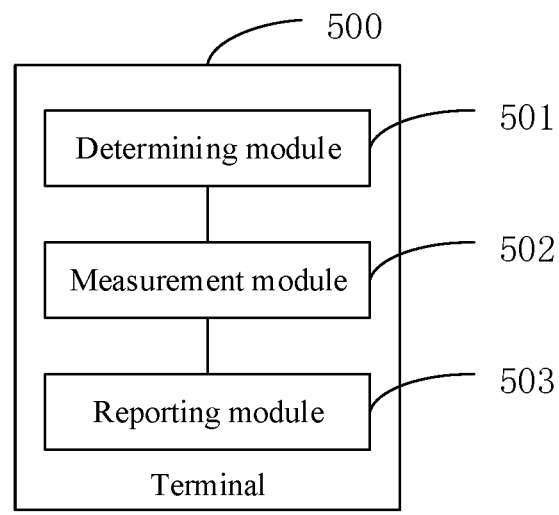
FIG. 6 is a structural diagram of another terminal according to an embodiment of this disclosure.

Optionally, as shown in FIG. 6, the terminal 500 further includes:
a reporting module 503, configured to report a measurement result, where the measurement result includes measurement results obtained through measurement in the all or part of the BWPs, or the measurement result is a measurement result obtained by combining PRS resources in the all or part of the BWPs and performing measurement on a combined resource, or a measurement result obtained by averaging or weighting measurement results obtained through measurement in the all or part of the BWPs.

Optionally, the reporting module 503 is configured to report a first message, where the first message includes the measurement result, and further includes at least one of the following:
a BWP identifier, a PRS resource identifier, a PRS resource set identifier, a TRP identifier, a cell identity, and a CC identifier.

Optionally, the measurement module 502 is configured to:
if a numerology of the PRS resource matches a numerology of the BWP, perform measurement on the resource position.

Optionally, at least one of the behavior of determining the resource position by the terminal and the behavior of performing measurement by the terminal is configured by a network, indicated by the network, specified by the protocol, or selected by the terminal.

The terminal provided in this embodiment of this disclosure is capable of implementing the processes that are implemented by the terminal in the method embodiment of FIG. 2, to improve a probability of detecting a PRS by the terminal. To avoid repetition, details are not described herein again.

Figure 7:
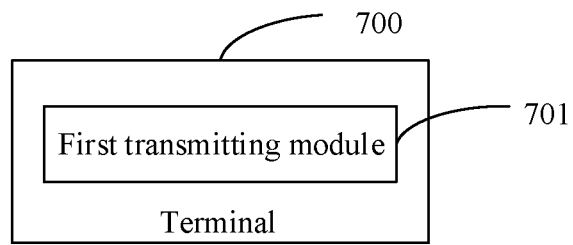
FIG. 7 is a structural diagram of another terminal according to an embodiment of this disclosure.

Referring to FIG. 7, FIG. 7 is a structural diagram of a terminal according to an embodiment of the present disclosure. As shown in FIG. 7, the terminal 700 includes:
a first transmitting module 701, configured to send first signaling, where the first signaling is used to assist a network device in configuring a measurement gap for measuring a PRS.

Optionally, the first signaling is signaling sent to the network device, and the first signaling is used to indicate a measurement gap configuration expected by the terminal; or
the first signaling is signaling sent to the network device and including positioning assistance information, and the first signaling is used to indicate configuring a measurement gap configuration associated with the positioning assistance information.

Optionally, the network device is a serving base station.

Optionally, the first signaling is further used to indicate to the network device that the terminal performs measurement by using a measurement gap, or the first signaling is further used to indicate to the network device that the terminal requests to perform measurement by using a measurement gap.

Optionally, in a case that the first signaling is used to indicate the measurement gap configuration expected by the terminal, the first signaling includes at least one of the following:
frequency information of a PRS resource, PRS measurement offset information, measurement gap pattern identification information, measurement gap timing advance, and the number of measurement gaps.

Optionally, the positioning assistance information includes at least one of the following:
search window information of a PRS resource, PRS time domain configuration information, PRS muting pattern information, and cell timing information.

Figure 8:
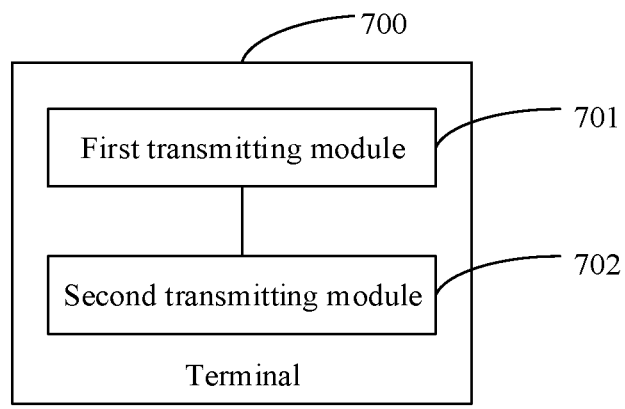
FIG. 8 is a structural diagram of another terminal according to an embodiment of this disclosure.

Optionally, as shown in FIG. 8, the terminal 700 further includes:
a second transmitting module 702, configured to send second signaling, where the second signaling is used to indicate to the network device that the terminal is to stop performing measurement by using the measurement gap.

Optionally, the first transmitting module 701 is configured to:
- if the PRS resource is not in an active BWP of the terminal, send the first signaling; or
- if part of the PRS resource is in an active BWP of the terminal, send the first signaling; or
- if part of the PRS resource is in an active BWP of the terminal and a first condition is satisfied, send the first signaling; or
- if a numerology of the PRS resource does not match a numerology of an active BWP of the terminal, send the first signaling.

Optionally, that the first condition is satisfied includes at least one of the following:
- a bandwidth of the part of PRS resource in the active BWP of the terminal is less than a bandwidth threshold;
- a bandwidth of the part of PRS resource in the active BWP of the terminal fails to meet a measurement accuracy requirement; and
- a numerology of the part of PRS resource in the active BWP of the terminal does not match a numerology of the active BWP of the terminal.

Optionally, the first signaling is positioning capability reporting signaling, and the positioning capability reporting signaling includes BWP bandwidth information.

Optionally, the network device is a location server.

With the terminal, a probability of detecting a PRS by the terminal can be improved.

The terminal provided in this embodiment of this disclosure is capable of implementing the processes that are implemented by the terminal in the method embodiment of FIG. 3, to improve positioning accuracy of the terminal. To avoid repetition, details are not described herein again.

Figure 9:
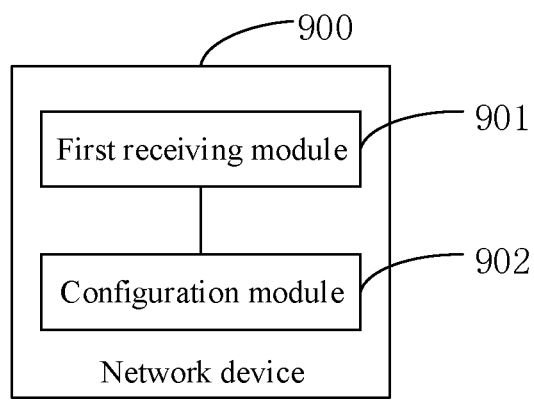
FIG. 9 is a structural diagram of a network device according to an embodiment of the present disclosure.

Referring to FIG. 9, FIG. 9 is a structural diagram of a network device according to an embodiment of the present disclosure. As shown in FIG. 9, the network device 900 includes:
- a first receiving module 901, configured to receive first signaling, where the first signaling is used to assist the network device in configuring a measurement gap for measuring a PRS; and
- a first configuration module 902, configured to configure, according to the first signaling, the measurement gap for measuring the PRS.

Optionally, the first signaling is used to indicate a measurement gap configuration expected by a terminal; or
the first signaling includes positioning assistance information, and the first signaling is used to indicate configuring a measurement gap configuration associated with the positioning assistance information.

Optionally, the network device is a serving base station.

Optionally, the first signaling is further used to indicate to the network device that the terminal performs measurement by using a measurement gap, or the first signaling is further used to indicate to the network device that the terminal requests to perform measurement by using a measurement gap.

Optionally, in a case that the first signaling is used to indicate the measurement gap configuration expected by the terminal, the first signaling includes at least one of the following:
frequency information of a PRS resource, PRS measurement offset information, measurement gap pattern identification information, measurement gap timing advance, and the number of measurement gaps.

Optionally, the positioning assistance information includes at least one of the following:
search window information of a PRS resource, PRS time domain configuration information, PRS muting pattern information, and cell timing information.

Figure 10:
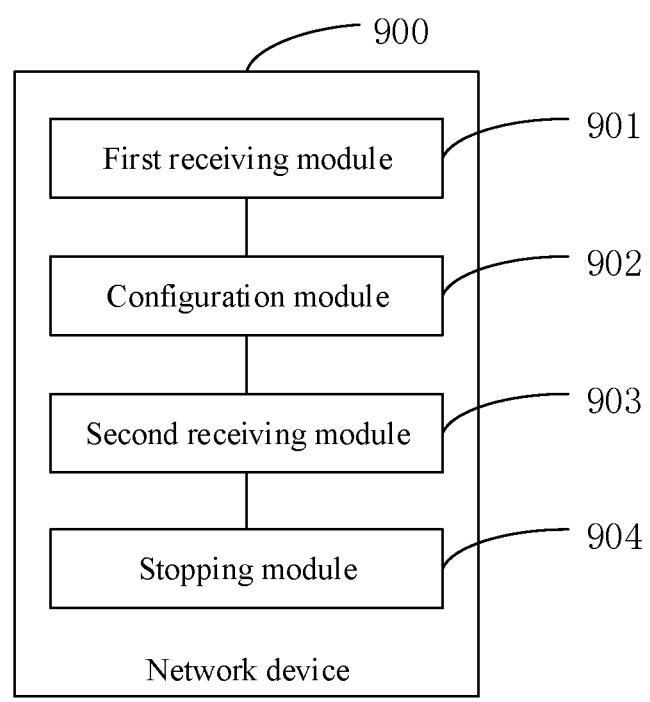
FIG. 10 is a structural diagram of another network device according to an embodiment of the present disclosure.

Optionally, as shown in FIG. 10, the communications device 900 further includes:
- a second receiving module 903, configured to receive second signaling, where the second signaling is used to indicate to the network device that the terminal is to stop performing measurement by using the measurement gap; and
- a stopping module 904, configured to stop, according to the second signaling, configuring the measurement gap.

Optionally, the first signaling is positioning capability reporting signaling, and the positioning capability reporting signaling includes BWP bandwidth information.

Optionally, the network device is a location server.

Optionally, the network device directly configures the measurement gap for a terminal; or
the network device configures the measurement gap for at least one of a serving cell and a neighboring cell, so that the serving cell configures the measurement gap for a terminal.

The network device provided in this embodiment of this disclosure is capable of implementing the processes that are implemented by the network device in the method embodiment of FIG. 4, to improve positioning accuracy of the terminal. To avoid repetition, details are not described herein again.

Figure 11:
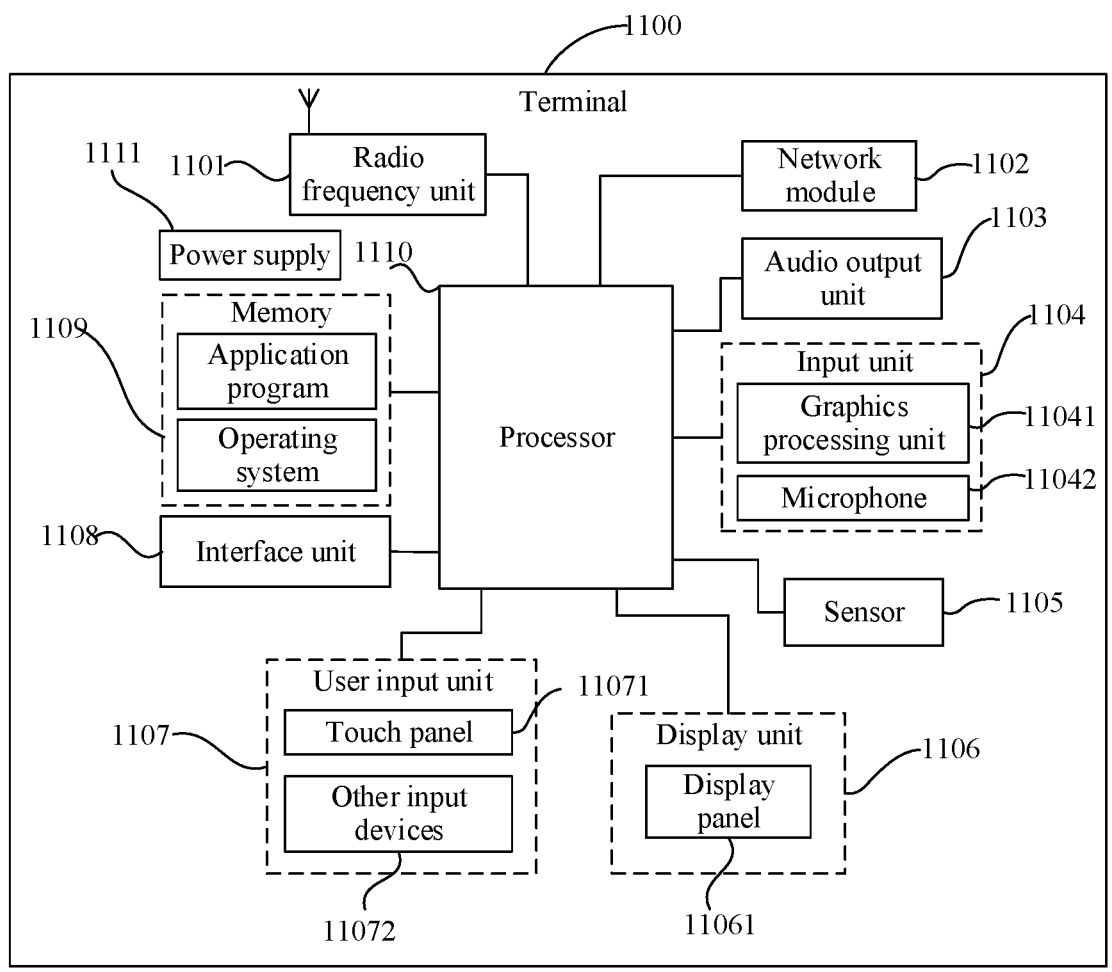
FIG. 11 is a structural diagram of another terminal according to an embodiment of this disclosure.

FIG. 11 is a schematic diagram of a hardware structure of a terminal for implementing the embodiments of this disclosure.

The terminal 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, a processor 1110, and a power supply 1111. A person skilled in the art may understand that the structure of the terminal shown in FIG. 11 does not constitute any limitation on the terminal device. The terminal may include more or fewer components than those shown in the figure, or a combination of some components, or the components disposed differently. In this embodiment of this disclosure, the terminal includes but is not limited to a mobile phone, a tablet computer, a laptop computer, a personal digital assistant, an in-vehicle terminal, a wearable device, a pedometer, and the like.

In one embodiment,
the processor 1110 is configured to determine a resource position of a PRS within a bandwidth part BWP based on a start physical resource block PRB position of a PRS resource and the number of PRBs; and
the radio frequency unit 1101 is configured to perform measurement on the resource position.

Optionally, the determining the resource position of the PRS within the BWP by the processor 1110 includes:
determining an index of an initial common resource block CRB of the PRS resource within the BWP and a bandwidth of the PRS resource within the BWP.

Optionally, in a case that an index of the start PRB position is smaller than an index of a start PRB of the BWP, the index of the initial CRB is the index of the start PRB of the BWP; or in a case that the index of the start PRB position is greater than or equal to the index of the start PRB of the BWP, the index of the initial CRB is the index of the start PRB position.

Optionally, in a case that the index of the start PRB position is greater than or equal to the index of the start PRB of the BWP and the index of the initial CRB is the index of the start PRB position, if nrofRBs>$N_{BWP}^{size}+N_{BWP}^{start}-N_{initial\ RB}$, $N_{PRS}^{BW}=N_{BWP}^{size}+N_{BWP}^{start}-N_{initial\ RB}$, and otherwise $N_{PRS}^{BW}$=nrofRBs; or in a case that the index of the start PRB position is less than the index of the start PRB of the BWP and the index of the initial CRB is the index of the start PRB of the BWP, if startingRB+nrofRBs>$N_{BWP}^{size}+N_{BWP}^{start}$, $N_{BWP}^{size}+N_{BWP}^{start}-N_{initial\ RB}$, and otherwise, $N_{PRS}^{BW}$=startingRB+nrofRBs–$N_{initial\ RB}$; where startingRB is the index of the start PRB position, $N_{BWP}^{start}$ is the index of the start PRB of the BWP, nrofRBs is the number of PRBs, $N_{BWP}^{size}$ is the bandwidth of the BWP, $N_{initial\ RB}$ is the index of the initial CRB, and $N_{PRS}^{BW}$ is the bandwidth.

Optionally, a frequency domain granularity of the PRS resource is 1 RB, 2 RBs, 4 RBs, or 8 RBs.

In a case that the frequency domain granularity is 1 RB, an index of the start PRB position is one value in (0, 1, 2, 3, . . . , 275*8–1), and the number of PRBs is one value in (Xmin, Xmin+1, Xmin+2, . . . Xmax), where Xmin is 1, 11, 12, 24, or 25, and Xmax is 264, 272, 273, 275, or 2200; or in a case that the frequency domain granularity is 2 RBs, an index of the start PRB position is one value in (0, 2, 4, 8, . . . , 2198), and the number of PRBs is one value in (Xmin, Xmin+2, Xmin+4, . . . Xmax), where Xmin is 2, 12, or 24, and Xmax is 264, 272, 274, 276, or 2200; or in a case that the frequency domain granularity is 4 RBs, an index of the start PRB position is one value in (0, 4, 8, . . . , 2196), and the number of PRBs is one value in (Xmin, Xmin+4, Xmin+8, . . . Xmax), where Xmin is 4, 12, or 24, and Xmax is 264, 272, 276, or 2200; or in a case that the frequency domain granularity is 8 RBs, an index of the start PRB position is one value in (0, 8, 16, 24, . . . , 2192), and the number of PRBs is one value in (Xmin, Xmin+8, Xmin+16, . . . Xmax), where Xmin is 8, 16, or 24, and Xmax is 264, 272, 280, or 2200.

Optionally, if the PRS resource spans a plurality of BWPs in a plurality of CCs, the determining the resource position of the PRS within the BWP by the processor 1110 includes:

determining the resource position of the PRS in the plurality of BWPs; and the performing measurement on the resource position includes:

performing measurement on the resource position of the PRS in all or part of the plurality of BWPs.

Optionally, the part of BWPs includes:

top N BWPs in descending order of the bandwidths, where N is an integer greater than or equal to 1; or BWPs whose bandwidths exceed a bandwidth threshold; or BWPs in at least one component carrier CC.

Optionally, the radio frequency unit 1101 is configured to report a measurement result, where the measurement result includes measurement results obtained through measurement in the all or part of the BWPs, or the measurement result is a measurement result obtained by combining PRS resources in the all or part of the BWPs and performing measurement on a combined resource, or a measurement result obtained by averaging or weighting measurement results obtained through measurement in the all or part of the BWPs.

Optionally, the reporting a measurement result by the radio frequency unit 1101 includes:

reporting a first message, where the first message includes the measurement result, and further includes at least one of the following:

a BWP identifier, a PRS resource identifier, a PRS resource set identifier, a transmission and reception point TRP identifier, a cell identity, and a component carrier CC identifier.

Optionally, the performing measurement on the resource position includes:

if a numerology of the PRS resource matches a numerology of the BWP, performing measurement on the resource position.

Optionally, at least one of the behavior of determining the resource position by the terminal and the behavior of performing measurement by the terminal is configured by a network, indicated by the network, specified by the protocol, or selected by the terminal.

With the terminal, a probability of detecting a PRS by the terminal can be improved.

In another embodiment, the radio frequency unit 1101 is configured to send first signaling, where the first signaling is used to assist a network device in configuring a measurement gap for measuring a PRS.

Optionally, the first signaling is signaling sent to the network device, and the first signaling is used to indicate a measurement gap configuration expected by the terminal; or the first signaling is signaling sent to the network device and including positioning assistance information, and the first signaling is used to indicate configuring a measurement gap configuration associated with the positioning assistance information.

Optionally, the network device is a serving base station.

Optionally, the first signaling is further used to indicate to the network device that the terminal performs measurement by using a measurement gap, or the first signaling is further used to indicate to the network device that the terminal requests to perform measurement by using a measurement gap.

Optionally, in a case that the first signaling is used to indicate the measurement gap configuration expected by the terminal, the first signaling includes at least one of the following:

frequency information of a PRS resource, PRS measurement offset information, measurement gap pattern identification information, measurement gap timing advance, and the number of measurement gaps.

Optionally, the positioning assistance information includes at least one of the following:

search window information of a PRS resource, PRS time domain configuration information, PRS muting pattern information, and cell timing information.

Optionally, the radio frequency unit 1101 is configured to send second signaling, where the second signaling is used to indicate to the network device that the terminal is to stop performing measurement by using the measurement gap.

Optionally, the sending first signaling by the radio frequency unit 1101 includes:

if the PRS resource is not in an active BWP of the terminal, sending the first signaling; or if part of the PRS resource is in an active BWP of the terminal, sending the first signaling; or if part of the PRS resource is in an active BWP of the terminal and a first condition is satisfied, sending the first signaling; or if a numerology of the PRS resource does not match a numerology of an active BWP of the terminal, sending the first signaling.

Optionally, that the first condition is satisfied includes at least one of the following:

a bandwidth of the part of PRS resource in the active BWP of the terminal is less than a bandwidth threshold;

a bandwidth of the part of PRS resource in the active BWP of the terminal fails to meet a measurement accuracy requirement; and a numerology of the part of PRS resource in the active BWP of the terminal does not match a numerology of the active BWP of the terminal.

Optionally, the first signaling is positioning capability reporting signaling, and the positioning capability reporting signaling includes BWP bandwidth information.

Optionally, the network device is a location server.

With the terminal, a probability of detecting a PRS by the terminal can be improved.

It should be understood that in this embodiment of this disclosure, the radio frequency unit 1101 may be configured to: receive and transmit signals in an information receiving/sending process or a call process; and specifically, after receiving downlink data from a base station, transmit the downlink information to the processor 1110 for processing, and in addition, transmit uplink data to the base station. Generally, the radio frequency unit 1101 includes but is not limited to an antenna, at least one amplifier, a transceiver, a coupler, a low noise amplifier, a duplexer, and the like. In addition, the radio frequency unit 1101 may further communicate with a network and another device through a wireless communications system.

The terminal provides a user with wireless broadband internet access through the network module 1102, for example, helping the user to transmit and receive e-mails, browse web pages, and access streaming media.

The audio output unit 1103 may convert audio data received by the radio frequency unit 1101 or the network module 1102 or stored in the memory 1109 into an audio signal, and output the audio signal as a sound. Furthermore, the audio output unit 1103 may also provide audio output (for example, a call signal received sound or a message received sound) related to a specific function performed by the terminal 1100. The audio output unit 1103 includes a speaker, a buzzer, a receiver, and the like.

The input unit 1104 is configured to receive an audio or video signal. The input unit 1104 may include a graphics processing unit (GPU) 11041 and a microphone 11042. The graphics processing unit 11041 processes image data of a still picture or video obtained by an image capture apparatus (such as a camera) in a video capture mode or an image capture mode. A processed image frame may be displayed on the display unit 1106. An image frame processed by the graphics processing unit 11041 may be stored in the memory 1109 (or another storage medium) or transmitted by the radio frequency unit 1101 or the network module 1102. The microphone 11042 can receive a sound and can process the sound into audio data. The processed audio data may be converted in a telephone call mode into a format that can be transmitted by the radio frequency unit 1101 to a mobile communications base station, for outputting.

The terminal 1100 may further include at least one sensor 1105, for example, an optical sensor, a motion sensor, and another sensor. Specifically, the optical sensor may include an ambient light sensor and a proximity sensor. The ambient light sensor may adjust luminance of the display panel 11061 based on brightness of ambient light, and the proximity sensor may turn off the display panel 11061 and/or backlight when the terminal 1100 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 1105 may also include a fingerprint sensor, a pressure sensor, an iris sensor, a molecular sensor, a gyroscope, a barometer, a hygrometer, a thermometer, an infrared sensor, and the like. Details are not described herein.

The display unit 1106 is configured to display information input by the user or information provided to the user. The display unit 1106 may include a display panel 11061, and the display panel 11061 may be configured in a form of a liquid crystal display (LCD), an organic light-emitting diode (OLED), or the like.

The user input unit 1107 may be configured to receive input digit or character information and generate key signal input related to user setting and function control of the mobile terminal. Specifically, the user input unit 1107 may include a touch panel 11071 and other input devices 11072. The touch panel 11071, also referred to as a touchscreen, may capture a touch operation performed by the user on or near the touch panel (for example, an operation performed by the user on the touch panel 11071 or near the touch panel 11071 by using any appropriate object or accessory such as a finger or a stylus). The touch panel 11071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, transmits the point coordinates to the processor 1110, and receives and executes a command transmitted by the processor 1110. In addition, the touch panel 11071 may be implemented in a plurality of forms, for example, a resistive, capacitive, infrared, or surface acoustic wave touch panel. The user input unit 1107 may further include the other input devices 11072 in addition to the touch panel 11071. Specifically, the other input devices 11072 may include but are not limited to a physical keyboard, a function key (such as a volume control key or a power on/off key), a trackball, a mouse, a joystick, and the like. Details are not described herein.

Further, the touch panel 11071 may cover the display panel 11061. When detecting a touch operation on or near the touch panel 11071, the touch panel 11071 transmits the touch operation to the processor 1110 to determine a type of a touch event. Then, the processor 1110 provides a corresponding visual output on the display panel 11061 based on the type of the touch event. Although in FIG. 11, the touch panel 11071 and the display panel 11061 act as two independent parts to implement input and output functions of the terminal, in some embodiments, the touch panel 11071 and the display panel 11061 may be integrated to implement the input and output functions of the terminal. This is not specifically limited herein.

The interface unit 1108 is an interface between an external apparatus and the terminal 1100. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 1108 may be configured to receive an input (for example, data information or power) from an external apparatus and transmit the received input to one or more elements within the terminal 1100, or may be configured to transmit data between the terminal 1100 and the external apparatus.

The memory 1109 may be configured to store software programs and various data. The memory 1109 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 1109 may include a high-speed random access memory, and may further include a non-volatile memory such as a disk storage device, a flash memory device, or another volatile solid-state storage device.

The processor 1110 is a control center of the terminal, and is connected to all components of the terminal by using various interfaces and lines. By running or executing a software program and/or module that is stored in the memory 1109 and calling data stored in the memory 1109, the processor 1110 executes various functions of the terminal and processes data, so as to perform overall monitoring on the terminal. The processor 1110 may include one or more processing units. Optionally, the processor 1110 may integrate an application processor and a modem processor. The application processor mainly processes the operating system, a user interface, the application program, and the like. The modem processor mainly processes wireless communication. It can be understood that the modem processor may alternatively be not integrated in the processor 1110.

The terminal 1100 may further include the power supply 1111 (for example, a battery) supplying power to all components. Optionally, the power supply 1111 may be logically connected to the processor 1110 through a power management system. In this way, functions such as charge management, discharge management, and power consumption management are implemented by using the power management system.

In addition, the terminal 1100 includes some functional modules that are not shown. Details are not described herein.

Preferably, an embodiment of this disclosure further provides a terminal, including a processor 1110, a memory 1109, and a computer program stored in the memory 1109 and running on the processor 1110. When the computer program is executed by the processor 1110, processes of the foregoing embodiments of method for configuring a PRS resource or the method for configuring a measurement gap can be implemented and a same technical effect can be achieved. To avoid repetition, details are not described herein again.

Figure 12:
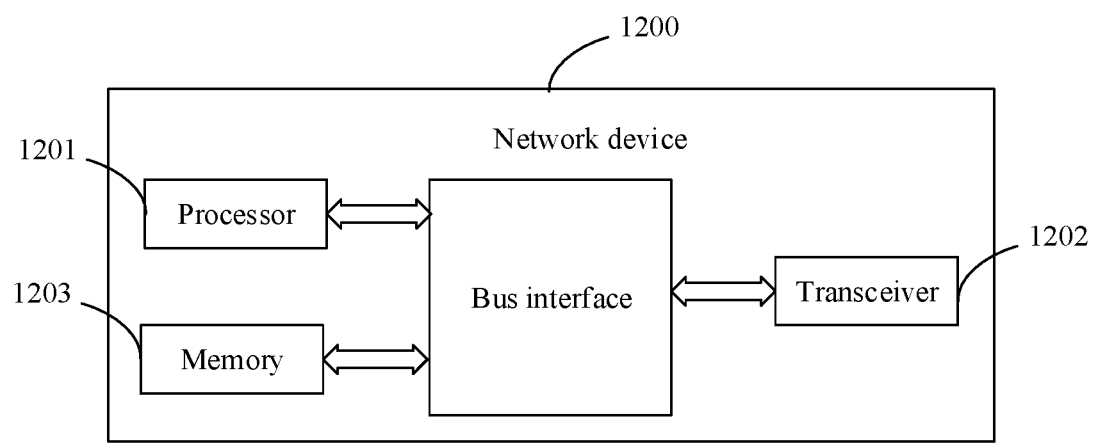
FIG. 12 is a structural diagram of another network device according to an embodiment of the present disclosure.

Referring to FIG. 12, FIG. 12 is a structural diagram of another network device according to an embodiment of this disclosure. As shown in FIG. 12, the network device 1200 includes a processor 1201, a transceiver 1202, a memory 1203, and a bus interface.

In one embodiment,
the transceiver 1202 is configured to receive first signaling, where the first signaling is used to assist the network device in configuring a measurement gap for measuring a PRS; and
the transceiver 1202 or the processor 1201 is configured to configure, according to the first signaling, the measurement gap for measuring the PRS.

Optionally, the first signaling is used to indicate a measurement gap configuration expected by a terminal; or
the first signaling includes positioning assistance information, and the first signaling is used to indicate configuring a measurement gap configuration associated with the positioning assistance information.

Optionally, the network device is a serving base station.

Optionally, the first signaling is further used to indicate to the network device that the terminal performs measurement by using a measurement gap, or the first signaling is further used to indicate to the network device that the terminal requests to perform measurement by using a measurement gap.

Optionally, in a case that the first signaling is used to indicate the measurement gap configuration expected by the terminal, the first signaling includes at least one of the following:
frequency information of a PRS resource, PRS measurement offset information, measurement gap pattern identification information, measurement gap timing advance, and the number of measurement gaps.

Optionally, the positioning assistance information includes at least one of the following:
search window information of a PRS resource, PRS time domain configuration information, PRS muting pattern information, and cell timing information.

Optionally, the transceiver 1202 is configured to send second signaling, where the second signaling is used to indicate to the network device that the terminal is to stop performing measurement by using the measurement gap.

The processor 1201 is configured to stop, according to the second signaling, configuring the measurement gap.

Optionally, the first signaling is positioning capability reporting signaling, and the positioning capability reporting signaling includes BWP bandwidth information.

Optionally, the network device is a location server.

Optionally, the network device directly configures the measurement gap for a terminal; or
the network device configures the measurement gap for at least one of a serving cell and a neighboring cell, so that the serving cell configures the measurement gap for a terminal.

With the network device, a probability of detecting a PRS by the terminal can be improved.

The transceiver 1202 is configured to receive and send data under control of the processor 1201. The transceiver 1202 includes at least two antenna ports.

In FIG. 12, a bus architecture may include any quantity of interconnected buses and bridges, and specifically connects together circuits that are of one or more processors represented by the processor 1201 and of a memory represented by the memory 1203. The bus architecture may further interconnect various other circuits such as a peripheral device, a voltage regulator, and a power management circuit. These are all well known in the art, and therefore are not further described in this specification. The bus interface provides an interface. The transceiver 1202 may be a plurality of components, including a transmitter and a receiver, and provides units for communicating with a variety of other apparatuses on a transmission medium. For different user equipments, the user interface 1204 may also be an interface that can be externally or internally connected to a required device. The connected device includes but is not limited to a keypad, a display, a speaker, a microphone, a joystick, and the like.

The processor 1201 is responsible for management of the bus architecture and general processing, and the memory 1203 is capable of storing data that is used by the processor 1201 during operation.

Optionally, an embodiment of this disclosure further provides a network device, including a processor 1201, a memory 1203, and a computer program stored in the memory 1203 and capable of running on the processor 1201. When the computer program is executed by the processor 1201, the processes of the foregoing embodiment of the method for measurement gap configuration are implemented, with the same technical effects achieved. To avoid repetition, details are not described herein again.

An embodiment of this disclosure further provides a computer-readable storage medium. The computer-readable storage medium stores a computer program, and when the computer program is executed by a processor, the processes of the embodiment of the method for configuring a PRS resource or the method for configuring a measurement gap applied to the terminal side according to the embodiments of this disclosure are implemented, or the processes of the embodiment of the method for configuring a measurement gap applied to the network device side according to the embodiments of this disclosure are implemented, with same technical effects achieved. To avoid repetition, details are not described herein again. The computer-readable storage medium is, for example, a read-only memory (ROM), a random access memory (RAM), a magnetic disk, or an optical disc.

It should be noted that the terms "include", "include", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

What is claimed is:

1. A method for configuring a measurement gap, comprising:
   sending, by a terminal, first signaling, wherein the first signaling is used to indicate to a network device that the terminal requests to perform measurement by using a measurement gap;
   wherein the first signaling is positioning capability reporting signaling, and the positioning capability reporting signaling comprises bandwidth part (BWP) bandwidth information.

2. The method according to claim 1, wherein the first signaling is signaling sent to the network device by the terminal, and the first signaling is used to indicate a measurement gap configuration expected by the terminal; or
   the first signaling is signaling sent to the network device by the terminal and comprising positioning assistance information, and the first signaling is used to indicate configuring the measurement gap configuration associated with the positioning assistance information.

3. The method according to claim 2, wherein the first signaling is further used to indicate to the network device that the terminal performs measurement by using the measurement gap, or the first signaling is further used to assist the network device in configuring the measurement gap for measuring a PRS.

4. The method according to claim 2, wherein in a case that the first signaling is used to indicate the measurement gap configuration expected by the terminal, the first signaling comprises at least one of the following:
   frequency information of a PRS resource, PRS measurement offset information, measurement gap pattern identification information, measurement gap timing advance, and the number of measurement gaps.

5. The method according to claim 2, wherein the positioning assistance information comprises at least one of the following:
   search window information of a PRS resource, PRS time domain configuration information, PRS muting pattern information, and cell timing information.

6. The method according to claim 1, further comprising:
   sending second signaling, by the terminal, wherein the second signaling is used to indicate to the network device that the terminal is to stop performing measurement by using the measurement gap.

7. The method according to claim 1, wherein the sending first signaling, by the terminal comprises:
   if PRS resource is not in an active BWP of the terminal, sending the first signaling; or
   if part of the PRS resource is in the active BWP of the terminal, sending the first signaling; or
   if part of the PRS resource is in the active BWP of the terminal and a first condition is satisfied, sending the first signaling; or
   if a numerology of the PRS resource does not match a numerology of the active BWP of the terminal, sending the first signaling.

8. The method according to claim 7, wherein that the first condition is satisfied comprises at least one of the following:
   a bandwidth of the part of PRS resource in the active BWP of the terminal is less than a bandwidth threshold;
   a bandwidth of the part of PRS resource in the active BWP of the terminal fails to meet a measurement accuracy requirement; and
   a numerology of the part of PRS resource in the active BWP of the terminal does not match a numerology of the active BWP of the terminal.

9. A terminal, comprising a memory, a processor, and a program stored in the memory and capable of running on the processor, wherein when the program is executed by the processor, the following steps of the method for configuring a measurement gap is implemented:
   sending, by the terminal, first signaling, wherein the first signaling is used to indicate to a network device that the terminal requests to perform measurement by using a measurement gap;
   wherein the first signaling is positioning capability reporting signaling, and the positioning capability reporting signaling comprises bandwidth part (BWP) bandwidth information.

10. The terminal according to claim 9, wherein the first signaling is signaling sent to the network device by the terminal, and the first signaling is used to indicate a measurement gap configuration expected by the terminal; or
    the first signaling is signaling sent to the network device by the terminal and comprising positioning assistance information, and the first signaling is used to indicate configuring a measurement gap configuration associated with the positioning assistance information.

11. The terminal according to claim 10, wherein the first signaling is further used to indicate to the network device that the terminal performs measurement by using the measurement gap, or the first signaling is further used to assist the network device in configuring the measurement gap for measuring a PRS.

12. The terminal according to claim 9, wherein when the program is executed by the processor, the following steps of the method for configuring the measurement gap is further implemented:
sending second signaling, by the terminal, wherein the second signaling is used to indicate to the network device that the terminal is to stop performing measurement by using the measurement gap.

13. The terminal according to 9, wherein the sending first signaling, by the terminal comprises:
if PRS resource is not in an active BWP of the terminal, sending the first signaling; or
if part of the PRS resource is in the active BWP of the terminal, sending the first signaling; or
if part of the PRS resource is in the active BWP of the terminal and a first condition is satisfied, sending the first signaling; or
if a numerology of the PRS resource does not match a numerology of the active BWP of the terminal, sending the first signaling.

14. The terminal according to claim 9, wherein that a first condition is satisfied comprises at least one of the following:
a bandwidth of the part of PRS resource in the active BWP of the terminal is less than a bandwidth threshold;
a bandwidth of the part of PRS resource in the active BWP of the terminal fails to meet a measurement accuracy requirement; and
a numerology of the part of PRS resource in the active BWP of the terminal does not match a numerology of the active BWP of the terminal.

15. A network device, comprising a memory, a processor, and a program stored in the memory and capable of running on the processor, wherein when the program is executed by the processor, the steps of the method for configuring a measurement gap is implemented, wherein the method comprises:
receiving first signaling, wherein the first signaling is used to indicate to the network device that a terminal requests to perform measurement by using a measurement gap; and
configuring, according to the first signaling, the measurement gap for measuring a PRS;
wherein the first signaling is positioning capability reporting signaling, and the positioning capability reporting signaling comprises bandwidth part (BWP) bandwidth information.

16. The network device according to claim 15, wherein the first signaling is used to indicate a measurement gap configuration expected by the terminal; or
the first signaling comprises positioning assistance information, and the first signaling is used to indicate configuring the measurement gap configuration associated with the positioning assistance information.

17. The network device according to claim 16, wherein the first signaling is further used to indicate to the network device that the terminal performs measurement by using the measurement gap, or the first signaling is further used to indicate to the network device that the terminal requests to perform measurement by using the measurement gap.

18. The network device according to claim 15, wherein the method further comprises:
receiving second signaling, wherein the second signaling is used to indicate to the network device that the terminal is to stop performing measurement by using the measurement gap; and
stopping, according to the second signaling, configuring the measurement gap.

* * * * *